US008621092B2

(12) United States Patent
Jacob et al.

(10) Patent No.: US 8,621,092 B2
(45) Date of Patent: Dec. 31, 2013

(54) REMOTE PORTLET CONSUMER WITH ENHANCED RESOURCE URL PROCESSING

(75) Inventors: Richard Jacob, Ostfildern (DE); Timo Kussmaul, Boeblingen (DE); Stephan Laertz, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 11/865,888

(22) Filed: Oct. 2, 2007

(65) Prior Publication Data

US 2008/0263216 A1 Oct. 23, 2008

(30) Foreign Application Priority Data

Dec. 19, 2006 (EP) .................................... 06126439

(51) Int. Cl.
*G06F 15/16* (2006.01)
(52) U.S. Cl.
USPC ............................ 709/229; 709/218; 709/219
(58) Field of Classification Search
None
See application file for complete search history.

(56) References Cited

U.S. PATENT DOCUMENTS

| | | | | | |
|---|---|---|---|---|---|
| 5,907,680 | A | * | 5/1999 | Nielsen .......................... | 709/228 |
| 6,047,292 | A | * | 4/2000 | Kelly et al. .................... | 715/716 |
| 6,292,833 | B1 | * | 9/2001 | Liao et al. ...................... | 709/229 |
| 6,463,578 | B1 | * | 10/2002 | Johnson ......................... | 717/124 |
| 6,633,914 | B1 | * | 10/2003 | Bayeh et al. ................... | 709/227 |
| 6,643,641 | B1 | * | 11/2003 | Snyder ........................... | 707/709 |
| 6,650,889 | B1 | * | 11/2003 | Evans et al. ................ | 455/412.1 |
| 6,865,593 | B1 | * | 3/2005 | Reshef et al. ................. | 709/203 |
| 6,959,286 | B2 | * | 10/2005 | Perkowski ................. | 705/26.62 |
| 7,085,817 | B1 | * | 8/2006 | Tock et al. .................... | 709/217 |
| 7,107,309 | B1 | * | 9/2006 | Geddes et al. ................ | 709/203 |
| 7,124,175 | B1 | * | 10/2006 | Wolfe et al. ................... | 709/219 |
| 7,203,758 | B2 | * | 4/2007 | Cook et al. .................... | 709/231 |
| 7,376,650 | B1 | * | 5/2008 | Ruhlen ............................. | 707/6 |
| 7,475,089 | B1 | * | 1/2009 | Geddes ............................. | 1/1 |
| 7,673,229 | B1 | * | 3/2010 | Pearson et al. ............... | 715/234 |
| 7,774,455 | B1 | * | 8/2010 | Tock et al. .................... | 709/224 |
| 7,809,837 | B2 | * | 10/2010 | Allamaraju et al. .......... | 709/227 |
| 7,996,450 | B1 | * | 8/2011 | Lee et al. ..................... | 707/899 |

(Continued)

*Primary Examiner* — Ian N Moore
*Assistant Examiner* — Dung B Huynh
(74) *Attorney, Agent, or Firm* — Jeff Tang; Hoffman Warnick LLC

(57) ABSTRACT

The present invention is directed to a method and system to be performed by a WSRP consumer portal server for accessing a remote network resource addressed by a respective resource URL in a web portal infrastructure comprising at least a WSRP Consumer Portal connectable to a client Browser requesting the remote network resource, and a remote communication partner. A method for accessing remote network resources, a WSRP consumer portal includes: in response to an incoming client request for a web page, determining if remote portlets are comprised of said requested web page; for remote portlets sending a request for a respective portlet markup to a producer of said remote portlets; receiving a response to said request comprising a markup document including encoded representations of network URLs of a respective remote network resource; searching said response for producer encoded resource URLs of remote network resources, resulting in a set of found URLs; generating for each producer encoded resource URL a set of rewritten URLs, wherein each rewritten URL provides an access performable by said client to said remote resource; generating from said received markup document a new markup document comprising an executable code fragment, having the function to be executed by the client to select a specific rewritten URL out of said set of rewritten URLs; and sending a newly assembled web page comprising said new markup document for remote portlets and an unchanged markup document for non-remote portlets.

6 Claims, 7 Drawing Sheets

(56) References Cited

U.S. PATENT DOCUMENTS

| | | |
|---|---|---|
| 2002/0015403 A1* | 2/2002 | McConnell et al. .......... 370/352 |
| 2002/0073075 A1* | 6/2002 | Dutta et al. ....................... 707/3 |
| 2002/0099850 A1* | 7/2002 | Farber et al. ................. 709/245 |
| 2002/0107917 A1* | 8/2002 | Pociu ............................ 709/203 |
| 2002/0118389 A1* | 8/2002 | Fukuda et al. ............... 358/1.15 |
| 2003/0009451 A1* | 1/2003 | Bates et al. ....................... 707/3 |
| 2003/0033434 A1* | 2/2003 | Kavacheri et al. ........... 709/246 |
| 2003/0061387 A1* | 3/2003 | Brown et al. ................. 709/246 |
| 2003/0065810 A1* | 4/2003 | Ims et al. ...................... 709/232 |
| 2003/0158871 A1* | 8/2003 | Fomenko ...................... 707/203 |
| 2003/0163548 A1* | 8/2003 | Stickler ........................ 709/218 |
| 2003/0188163 A1* | 10/2003 | Fischer et al. ................ 713/170 |
| 2003/0188263 A1* | 10/2003 | Bates et al. ................... 715/513 |
| 2004/0049574 A1* | 3/2004 | Watson et al. ................ 709/224 |
| 2004/0133660 A1* | 7/2004 | Junghuber et al. ........... 709/219 |
| 2004/0205555 A1* | 10/2004 | Hind et al. .................... 715/513 |
| 2004/0243928 A1* | 12/2004 | Hesmer et al. ................ 715/505 |
| 2005/0185658 A1* | 8/2005 | Kamiwada et al. ........... 370/401 |
| 2005/0198332 A1* | 9/2005 | Laertz et al. .................. 709/229 |
| 2005/0223081 A1* | 10/2005 | McMahan et al. ............ 709/218 |
| 2005/0256808 A1* | 11/2005 | Allamaraju et al. ............. 705/67 |
| 2006/0085520 A1* | 4/2006 | Allamaraju et al. .......... 709/218 |
| 2006/0212798 A1* | 9/2006 | Lection et al. ................ 715/513 |
| 2007/0006016 A1* | 1/2007 | Allamaraju ....................... 714/4 |
| 2007/0006318 A1* | 1/2007 | Allamaraju et al. ............. 726/27 |
| 2007/0073831 A1* | 3/2007 | Oscherov et al. ............. 709/217 |
| 2007/0288836 A1* | 12/2007 | Partovi ........................ 715/500.1 |
| 2007/0298810 A1* | 12/2007 | Kasher et al. ............... 455/452.1 |
| 2007/0299984 A1* | 12/2007 | Roy et al. ...................... 709/232 |
| 2010/0250397 A1* | 9/2010 | Ippolito ........................... 705/27 |

* cited by examiner

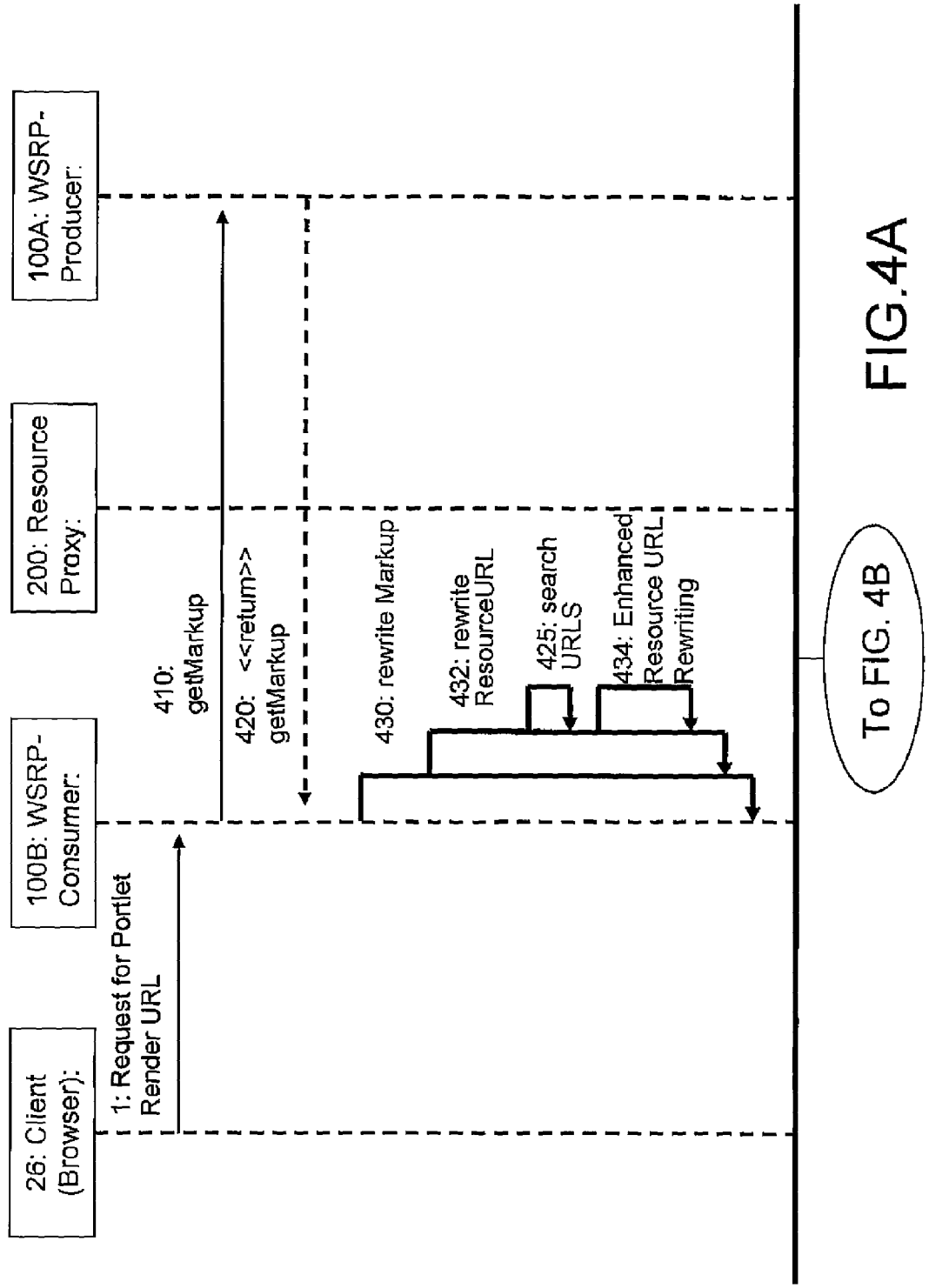

REMOTE PORTLET CONSUMER WITH ENHANCED RESOURCE URL PROCESSING

FIELD OF THE INVENTION

The present invention relates to the field network computing, and in particular to Web content accessible via a Web portal, and in particular to a method and system to be performed by a WSRP consumer portal server for accessing a remote network resource addressed by a respective resource URL in a web portal infrastructure comprising at least: a WSRP Consumer Portal connectable to a client Browser requesting the remote network resource, and a remote communication partner.

BACKGROUND OF THE INVENTION

Portals provide end users with unified access to content, applications, and collaboration services in a highly personalized manner. An example is IBM's WebSphere Portal which provides a middleware framework and tools for building and managing portals using component applications called "Portlets".

Typically a Portal employs an architecture where the Portal itself only implements standard functionality like authentication, state handling, aggregation, caching, user management, and so on and provides the infrastructure for application components. This architecture includes APIs for the integration of applications so that applications from different partners can be used as long as they match the Portal product's API. In the Portal environment, these applications are typically called Portlets.

Portlets are pluggable components that can be added to Portals and are designed to run inside a Portal's Portlet container. Portlets may provide different functions ranging from simple rendering of static or dynamic content to application functions such as e-mail, calendar, etc. Portlets are invoked indirectly via the Portal application and produce content that is suited for aggregation in larger pages, e.g., Portlets should produce mark-up fragments adhering guidelines that assure that the content generated by different Portlets can be aggregated into one page. Typically, Portlets run on the Portal-Server, processing input data and rendering content locally.

FIG. 1A gives a schematic system view on a Web server implementing such prior art Portal.

A prior art Portal as e.g., represented by above IBM WebSphere Portal is built by a complex functionality implemented on a network server—for example a Web server 100, which has elements including logic components for user authentication 105, state handling 110, aggregation 115 of fragments, a plurality of Portlets 120—further described below—provided in respective pages 125 with a respective plurality of APIs 130 to a respective Portlet container software 135 for setting them into the common Web page context, and some Portal storage resources 140. The logic components are operatively connected such that data can be exchanged between single components as required. This is roughly depicted in FIG. 1A.

In more detail, a Portal engine of the Web server in FIG. 1A implements an aggregation of Portlets 120 based on the underlying Portal model 150 and Portal information such as security settings, user roles, customization settings, and device capabilities. Within the rendered page, the Portal automatically generates the appropriate set of navigation elements based on the Portal model. The Portal engine invokes Portlets during the aggregation as required and when required and uses caching to reduce the number of requests made to Portlets. The prior art IBM WebSphere Portal employs open standards such as the Java Portlet API (application programming interface). It also supports the use of a remote Portlet via the WSRP standard.

The Portal model represents the Portal's content structure, i.e., the hierarchical structure of portal pages—which may again contain nested pages—and portlets, which are arranged on pages. This data is stored in the database 128 in an adequate representation based on prior art techniques like relational tables.

Web clients interact with portlets via a request/response paradigm implemented by the portal. Usually, users interact with content produced by portlets by, for example, following links or submitting forms, resulting in portlet actions being received by the portal, which are then forwarded to the portlets targeted by the user's interactions.

Accordingly, the Portal waits for client requests and responds to these requests. A client request message includes a URL/URI which addresses the requested page.

The before-mentioned aggregation logic includes all steps that are required to assemble a page that is sent back to the client. Typically, these steps are to load the Portal model from the Portal database, to traverse it and to call the instances referenced in the model in order to obtain their output, which is assembled to a single page. The Portal model may be defined as the relationship as well as the arrangement of the components that are used to create the visual representation of the content. The Portal model will be defined through the Manual Layout Interface 160 by the administrators or users and is saved in the database.

An activity in the rendering and aggregation processes is the generation of URLs that address Portal pages. A URL is generated by the Aggregation logic and includes coded state information.

By including the state information in a URL, the Portal ensures that it is later able to establish the navigation and presentation context when the client sends a request for this URL.

The Portlet container 135 is a single control component competent for all Portlets 120, which may control the execution of code residing in each of these Portlets. It provides the runtime environment for the Portlets and the facilities required for event handling, inter-Portlet messaging, and access to Portlet instance and configuration data, among others. The Portal resources 140 are in particular the Portlets 120 themselves and the pages 125, on which they are aggregated in form of an aggregation of fragments. A Portal database 128 stores the portlet description, this is in detail the portlet identifier, the portlet description featuring some attributes like portlet name, portlet description, portlet title, portlet short title, and keywords.

With special focus now at the present invention remote portlets are portlets, which reside on a different portal server and which are accessed through an appropriate web service protocol. The prior art Web Services for Remote Portlets (WSRP) specification defines a web service interface for accessing and interacting with portlets. In particular, WSRP allows a Portal to issue requests for remote portlets. WSRP supports: "Producers", in the sense of WSRP or any other suited protocol supporting remote portlets that provide portlets as WSRP conformant web services; and, "Consumers" that use and invoke WSRP conformant web services, i.e., remote portlets.

A prior art WSRP Producer is a portal (see also FIG. 1A) that comprises a WSRP producer 190 and a SOAP server 180.

A WSRP Consumer (see FIG. 1B) is a portal which comprises a SOAP client 205 and a WSRP consumer 225.

The SOAP client 205 implements the functionality to invoke Web services over the SOAP protocol.

The WSRP consumer provides the functionality to invoke remote portlets over the WSRP protocol.

FIG. 1C illustrates the prior art interactions between a WSRP Consumer portal 100B and a WSRP Producer portal 100A.

Prior art WSRP Consumers allow to define so-called proxy portlets 225, which represent remote portlets on the consumer. The proxy portlet 226 is implemented by a portlet which adheres to the prior art portlet API. Instead of providing the functionality to process portlet requests, it implements functionality to invoke remote portlets through the WSRP consumer. By use of such type of proxy portlets 225 the advantage results that the other portlet components and in particular the portlet container do not need to be changed when they are required to support WSRP. The portlet container of the WSRP consumer portal shown in FIG. 1B invokes the proxy portlet 226 passing a portlet request. The proxy portlet invokes the WSRP consumer 225 to process the request. The WSRP consumer prepares the WSRP request message according to the passed portlet request and invokes the WSRP operation through the SOAP client 205. The SOAP client transfers the request message to the WSRP Producer portal 100A.

The SOAP server 180 implements the functionality to receive, process and to respond to SOAP requests. The SOAP server 180 is conFIGUREd to invoke the WSRP producer 190 when it receives a WSRP request (see left-to-right arrow in FIG. 1C). The WSRP producer accepts the WSRP request from the SOAP server and processes the request by preparing and invoking a respective request on its Portlet container 135. The portlet container processes the request by invoking the respective portlet, here a remote portlet 99 in view of the initial request, and returns the resulting response to the WSRP producer 190. From this response the WSRP producer creates the WSRP response and returns it to the SOAP server 180. The SOAP server finally returns the response to requester (see right-to-left arrow).

Next the aspects of Resource URL processing and Resource proxy functionality in prior art are described:

Prior art WSRP implementations realize so-called "resource URL" processing. As part of its markup, a Portlet will often need to create resource URLs that reference remote, non-portlet resources 98 such as JavaScripts, HTML documents, Servlets, Cascading Stylesheets, etc. It should be added that in contrast, another type of URL, namely so called portlet URLs, point to a portlet itself. Portlet URLs are not considered further in the context of the invention.

With additional reference to prior art FIG. 2, illustrating a sample interaction in a 3-tier system environment between a consumer portal 100B, a producer portal 100A and an end user client, when this End-User using a client Browser 26 activates a resource URL on the client by clicking a link or submitting a form, a new request issued to the network resource should result, step 210.

Typically a Producer not only offers the portlet but also provides the resources 98 that are referenced by the portlet 99.

In a 3-tier remote portlet scenario as depicted in FIG. 2, the end-user's client may not have access to the Producer portal 100A, for example because the Producer portal 100A is shielded from the client 26 via a firewall. In this case the networks are separated, and a URL generated by the Producer 100A cannot be invoked by the client.

Therefore prior art Consumer portals 100B incorporate a resource proxy component 200 (see FIG. 1B, 1C), which is able to accept a request for a resource issued by a client 26, to request the respective resource from the Producer 100A and to return the resource to the client 26.

In more detail, FIG. 2 shows a sample interaction between a consumer 100B and a producer 100A. Here a client 26 is assumed to request a portal page. In consequence the Consumer portal 100B invokes the WSRP getMarkup operation on the Producer in step 220. In detail, in step 220 the consumer invokes the getMarkup operation through its WSRP consumer 225 and its SOAP client 205 components which are not shown in FIG. 2, in order to improve clarity. The getMarkup response received in step 230 contains the markup generated by the remote portlet 99. The remote portlet 99 uses a special syntax to encode URLs. The WSRP consumer 225 of consumer portal 100B processes the portlet markup returned by the Producer portal 100A in order to rewrite URLs, step 240, comprising rewriting resource URLs, step 250. The WSRP Consumer detects resource URLs in the markup and modifies them, step 260, step 270, to point to the resource proxy and to include according context:

In more detail, the Consumer 225 of consumer portal 100B replaces a resource URL by a resource URL which is newly generated, step 270, wherein the newly generated one points to the resource proxy 200 and contains context information, that the resource proxy 200 in turn uses to locate and request the remote resource 98.

Finally the portal page is returned to the client, step 275.

When an end user activates the newly generated resource URL, the client Browser 26 sends a request to the resource proxy 200, step 280. The resource proxy 200 processes the context information contained in the URL, prepares the request by e.g. accessing a lookup table entering the client specified URL and looking up the producer portal-specific URL and sends a request to the resource, step 285. The resource proxy 200 accepts the data returned by the resource in step 290 and returns the data to the client in step 295.

The disadvantage of the above described prior art is, amongst others, that the consumer portal performs a resource URL rewriting independently of the underlying network structure. In particular, rewriting is done also in those cases in which it is not necessary, basically because a remote resource at the producer portal is directly reachable for a requesting client. Further, the URL rewriting process requires two different accesses to network resources, when the requesting end user client wants to access the remote resource. The first network access is the access to the resource proxy 200 described above, and the second network access is the actual access performed by this proxy portlet at the producer portal.

The objective of the present invention is to provide an improved access method for accessing remote network resources.

SUMMARY OF THE INVENTION

This objective of the invention is achieved by the features stated in enclosed independent claims. Further advantageous arrangements and embodiments of the invention are set forth in the respective dependent claims. Reference should now be made to the appended claims.

An aspect of the present invention is based on the above mentioned objective and includes the aspect to enable the client browser in the above communication structure to determine an optimized access pass to a remote network resource, before the actual access happens. This may be obtained by an enhanced resource-URL rewriting procedure.

According to another aspect, the present invention discloses a method to be performed by a consumer portal server for providing access to a remote network resource addressed by a respective resource URL in a web portal infrastructure comprising at least: a WSRP Consumer Portal connectable to a client Browser requesting said remote network resource, and a remote communication partner—either a WSRP Producer Portal or a pure WSRP Producer having a Portlet Container and a Webserver—hosting said remote network resource, characterised by the steps of: a) in response to an incoming client request for a web page, determining if remote portlets are comprised of said requested web page; b) for remote portlets sending a request, e.g. by a get markup operation, for a respective portlet markup to the producer (190) of said remote portlets; c) receiving a response to said request comprising a markup document including encoded representations of network URLs of a respective remote network resource; d) searching said response for producer encoded resource URLs of remote network resources, resulting in a set of found URLs; e) generating for each producer encoded resource URL a set of rewritten URLs, wherein each rewritten URL provides an access performable by said client to said remote resource; f) generating from said received markup document a new markup document comprising an executable code fragment, having the function to be executed by the client to select a specific rewritten URL out of said set of rewritten URLs; g) sending a newly assembled web page comprising said new markup document for remote portlets and an unchanged markup document for non-remote portlets.

The remote communication partner is in case of WSRP use either a WSRP Producer Portal or a pure WSRP Producer having a Portlet Container and a Webserver hosting the remote network resource.

At the client Browser implemented in a networked environment comprising a WSRP Consumer Portal connectable to the client Browser requesting said remote network resource, and a remote communication partner hosting the remote network resource, the following steps are performed for accessing the above mentioned remote network resource: a) in response to a pre-sent client request for a web page receiving a response comprising a newly assembled web page and a code fragment executable by said client; b) invoking said code fragment to select a specific URL out of a set of URLs which accesses a remote resource.

When the selection is performed, then the URL can be tested and response times can be stored temporarily. This can be done for all of the URLs. Then in a request for a remote resource, which is actually and manually triggered by a person using the client browser, i.e., in case of a "serious" request, the best performing URL can be automatically used for accessing the remote network resource.

By that the above objective is achieved an the advantage results that at access time the client selects the very URL which offers the best performance dependent of the actually prevailing network topology.

Advantageously, the workload required at the WSRP Consumer Portal is substantially decreased, because instead of two network requests only one network request is performed, i.e., that one of the client Browser, when the user clicks the rewritten URL, enabling the client to directly access the remote resource without an interaction of the WSRP Consumer Portal being necessary.

In an embodiment, the set of URLs is implemented in a list-like form in the markup document sent to the client Browser.

In another embodiment, the following steps are added at the consumer portal: h) adding a weight to each found URL, said weight being a parameter reflecting the response time required to access the said remote network resource; i) adding an executable code fragment, ie a script, ready to be invoked by the requesting Client Browser, which comprises functionality to select the best weighted URL, and to invoke said best weighted URL; and j) replacing the found resource URL by a reference which invokes said executable code fragment.

Accordingly, at the client, the following further steps are performed: d) receiving a web page comprising one or multiple rewritten URLs and an added executable code fragment which comprises functionality to select a best weighted URL; e) executing said executable code fragment for sending a request with the best weighted URL.

The script may be transferred to the client as a part of the markup. Alternatively, it is transferred in a separate document that is referenced through a link or an identifier contained in the markup.

The client executes the script and the script execution selects one URL from the set-off resource URLs. The selected URL is then used for performing the actual access to the network resource. The selection is based on an evaluation of performance parameters collected for each URL comprised of the set. The URL having the best performance is automatically selected by the script.

Even without the script, which selects the best performing URL, the inventional resource URL rewriting procedure enables the client to access the remote network resource with a single network access.

In above URL rewriting procedure for each resource URL pointing to a remote network resource some set of URLs is generated along with an executable script. This set of URLs contains at least the original resource URL pointing to the actual requested resource at the producer portal, further the URL pointing to the resource proxy portlet located at the WSRP consumer portal and further URLs pointing to replica or to copies of the resource proxy portlet or copies of the remote resource at the producer portal. These replicas can be created and managed by a prior art replication component which can advantageously be combined with the invention.

In another implementation of the inventional method the performance statistics collected from the different URLs contained in the before mentioned set of URLs is evaluated by the consumer portal. An advantage includes that the evaluation can take place asynchronously to the requests made by the client. This had to increase the network performance in view of the client.

A portlet at the WSRP consumer portal may be dedicated to do the performance measurements and store the measured values in the portal database and generates the respective scripts and the set of resource-URLs.

BRIEF DESCRIPTION OF THE DRAWINGS

The present invention is illustrated by way of example and is not limited by the shape of the figures of the drawings in which.

DETAILED DESCRIPTION

Figure 3:
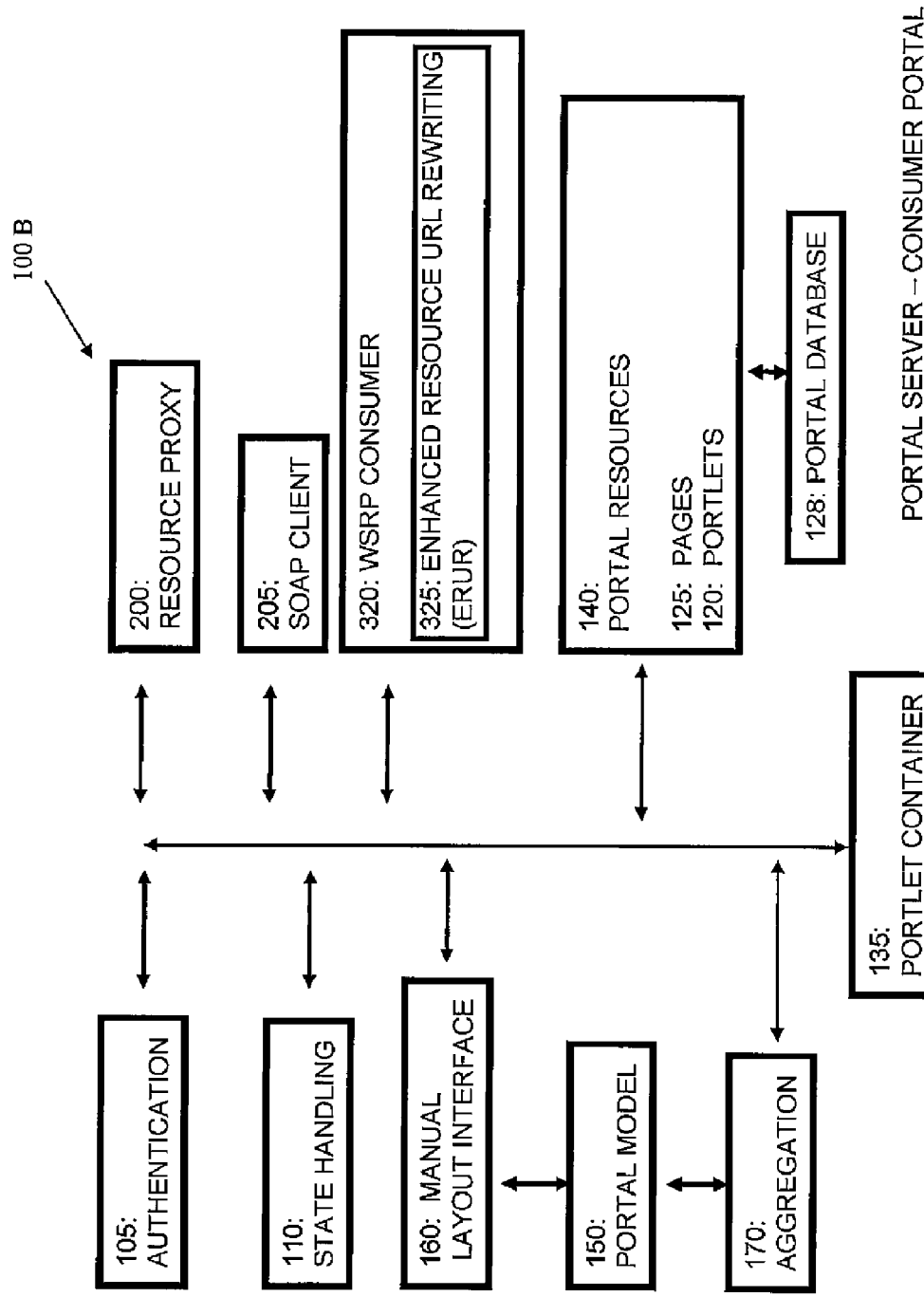
FIG. 3 illustrates the most basic structural components of a prior art hardware and software environment of a WSRP Consumer Portal used for an embodiment of the method of the present invention.

FIG. 3 shows a consumer Portal 100B comprising the present invention's Enhanced Resource URL Rewriting (ERUR) component 325, which is part of the present invention's functional program component WSRP consumer 320. Consumer 320 is implemented as a portlet and comprises functional interfaces to the portlet container 135 and the portal database 128.

Figure 4B:
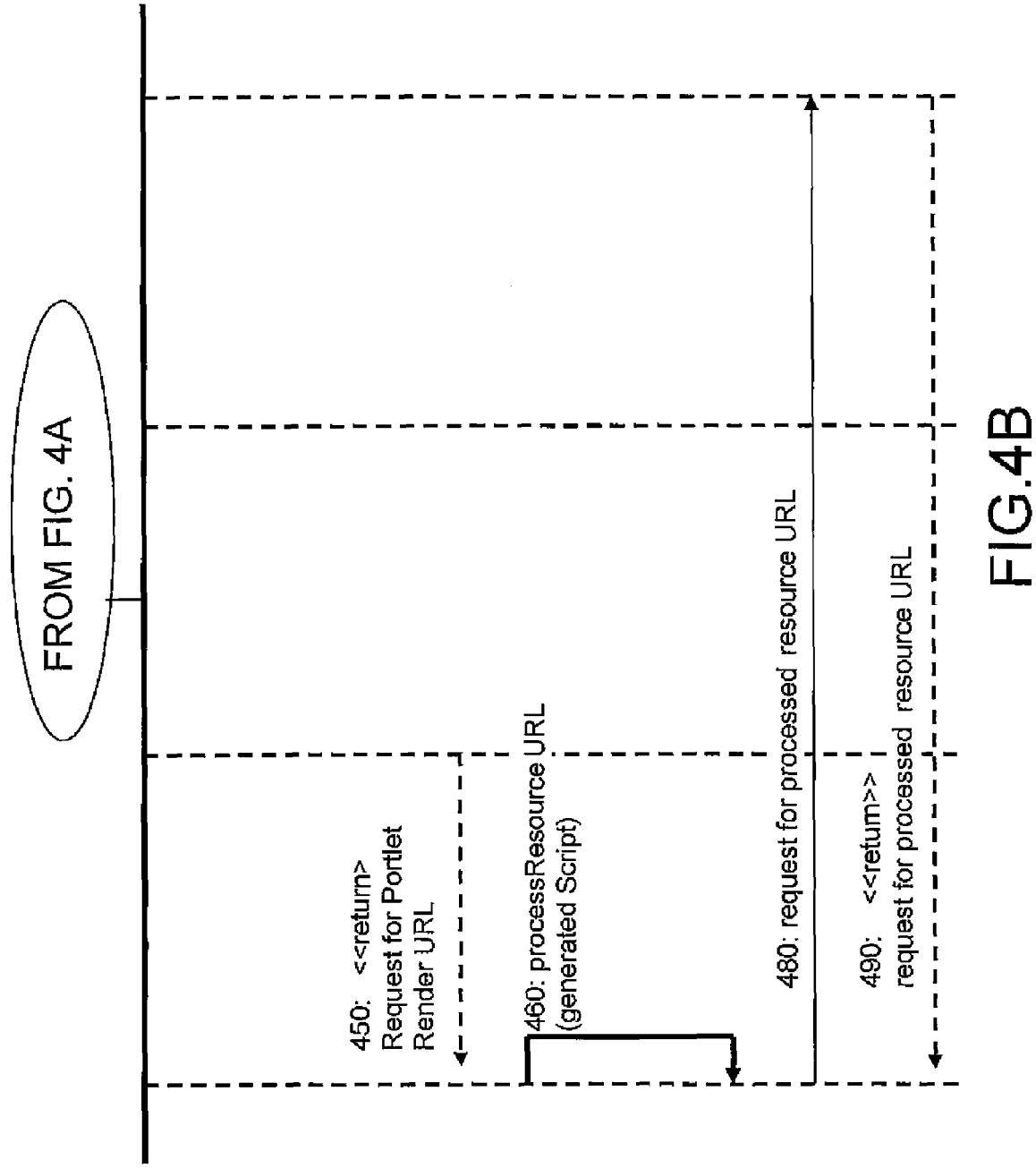
FIG. 4 illustrates a more detailed interaction diagram between client, consumer portal, resource proxies at the consumer portal and a producer portal during a method of the present invention.

FIG. 4 shows a sample interaction between a WSRP consumer comprising the present invention's ERUR component and a WSRP producer.

After the client requests a portal page, the Consumer portal invokes the WSRP getMarkup operation on the Producer, step 410.

The getMarkup response received in step 420 contains the markup generated by the portlet, and URLs contained in the markup are encoded using a special syntax.

Figure 1A:
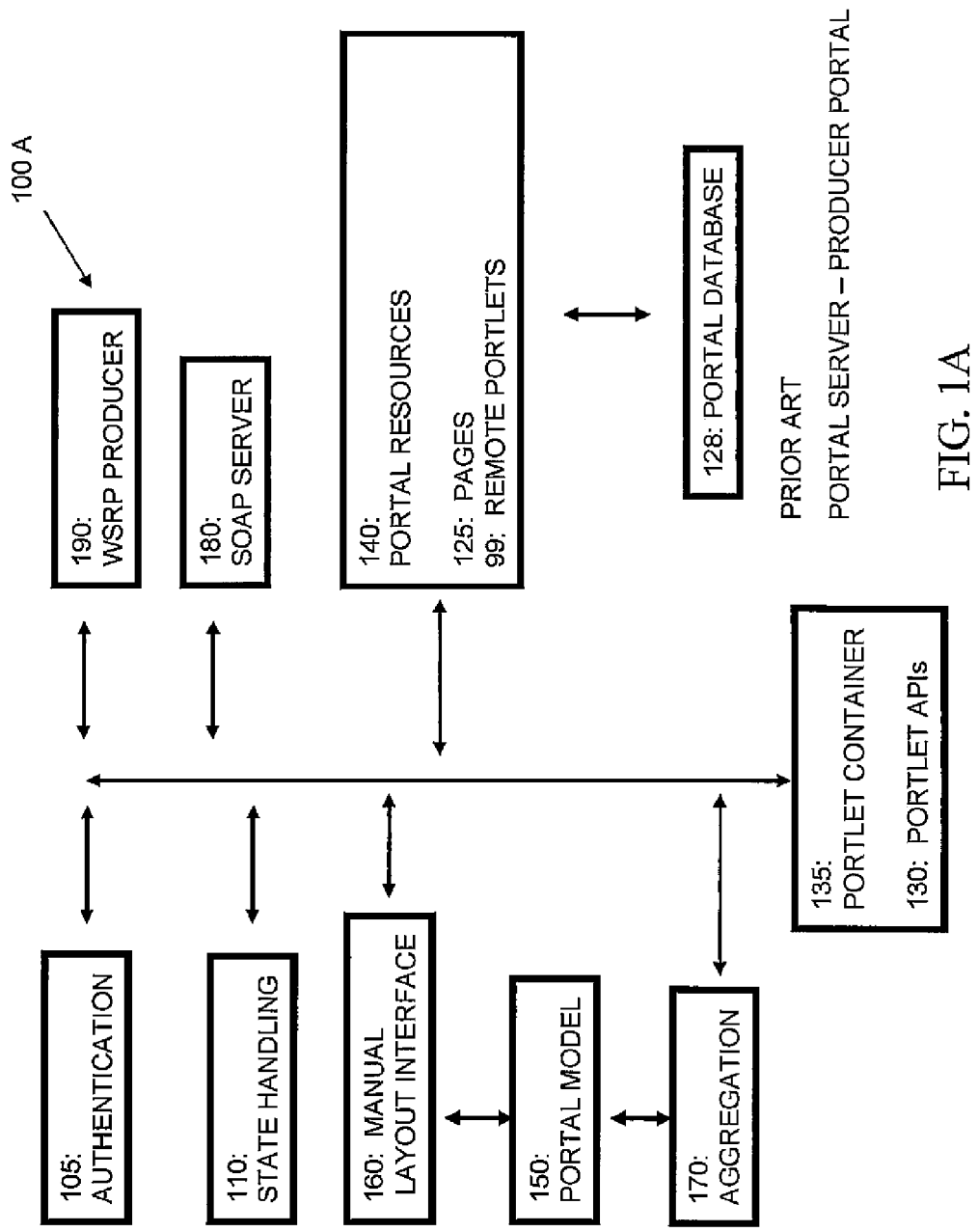
FIG. 1A illustrates the most basic structural components of a prior art hardware and software environment of a WSRP Producer Portal used for a prior art method.
Figure 1B:
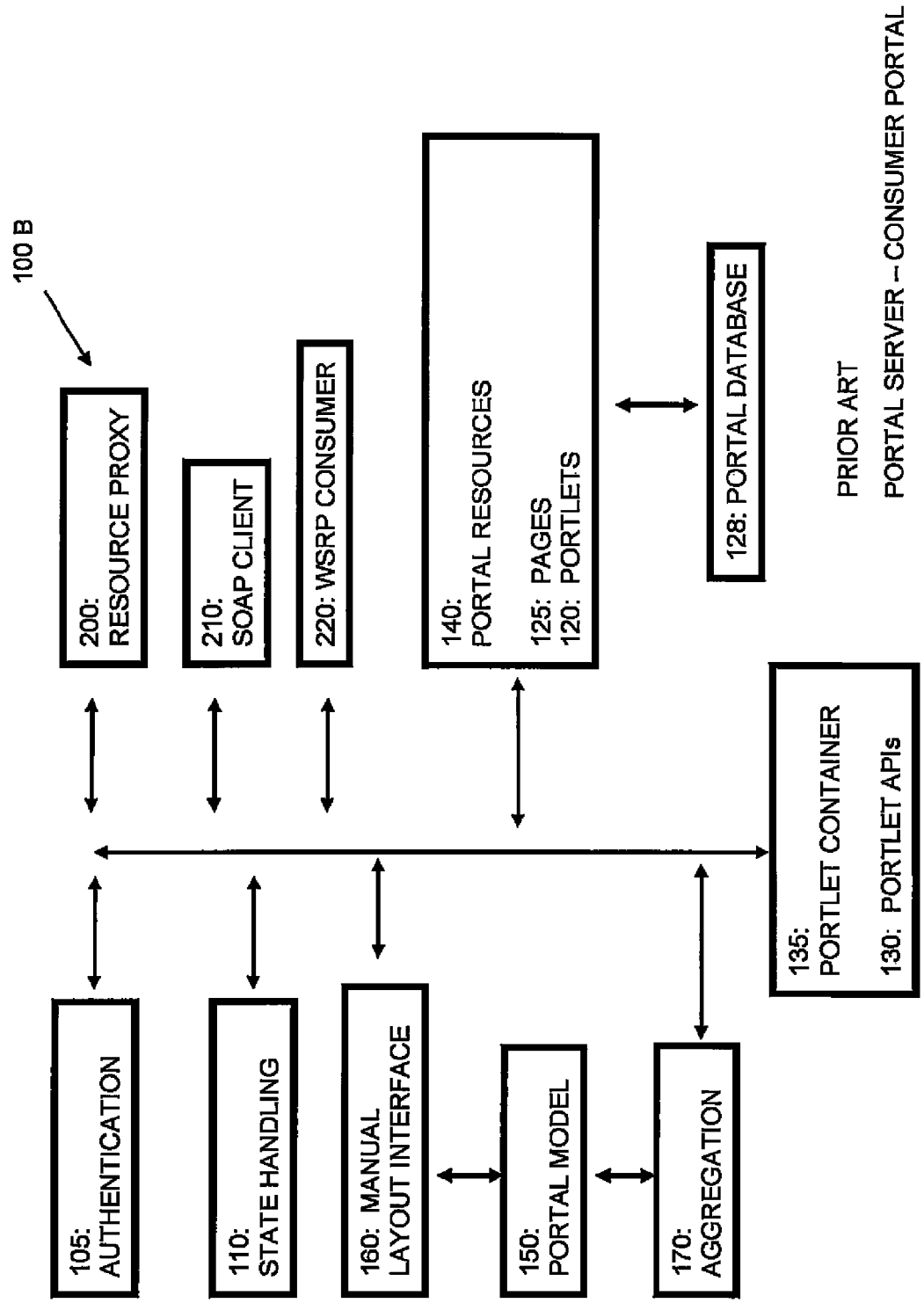
FIG. 1B illustrates the most basic structural components of a prior art hardware and software environment of a WSRP Consumer Portal used for a prior art method.
Figure 1C:
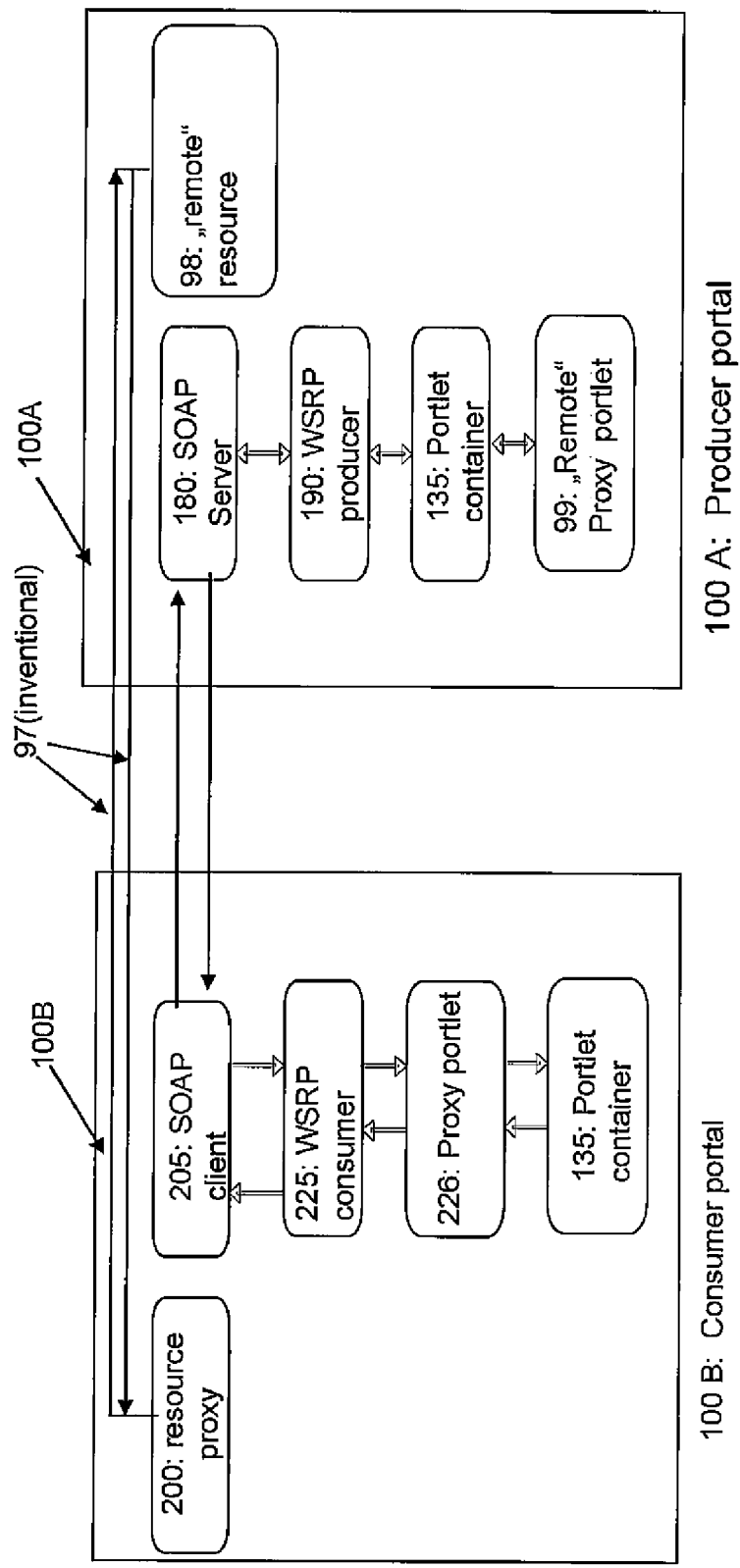
FIG. 1C illustrates the interaction between a prior art consumer portal and a prior art producer portal in a prior art method (except the denotation of an arrow 97, which is not prior art, but a portion of the present invention).
Figure 2:
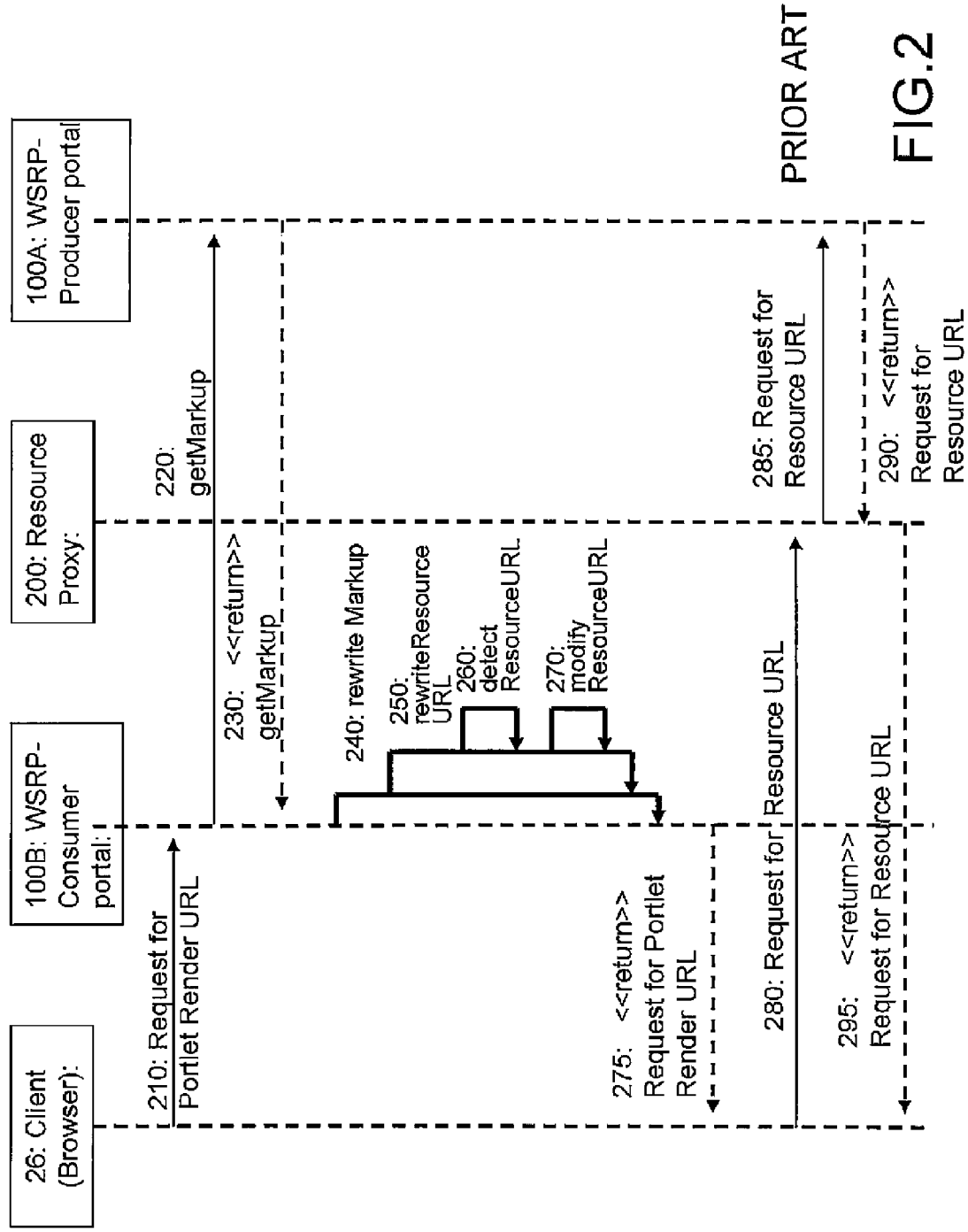
FIG. 2 illustrates a more detailed interaction diagram between client, consumer portal, resource proxies at the consumer portal and a producer portal during a prior art method.

The WSRP consumer processes the portlet markup returned by the Producer in order to rewrite URLs, see step 430, comprising some rewriting of resource 98 URLs, see step 432, and FIGS. 1C and 4A.

In more detail, the WSRP Consumer detects resource URLs in the markup by searching for the special prior art syntax that is used normally for URL encoding by the remote portlet. For each resource URL that is found, the consumer performs, see step 434, a so-called "Enhanced Resource URL Rewriting" abbreviated as ERUR:

In this embodiment the ERUR functionality is implemented as a program component which creates a set of URLs and a code fragment in a script language which can be processed by the client.

ERUR component 325 associates each URL in the set of URLs with a weight value, e.g., one URL pointing to the resource proxy 200 being associated with a low weight value, and one URL pointing directly to the resource 99 being associated with a high weight value. The higher the score the better is the assumed performance to request the URL from the client 26.

The ERUR component 325 follows the subsequent logic to create the set of URLs: First, create one URL pointing directly to the resource 98. Therefore decode the encoded representation of the URL that is contained in the markup. Assign a high weight to this URL. The high weight indicates that the consumer wants the client to use this URL, relieving the consumer's resource proxy 200. Second, create one URL pointing to the resource proxy 200. ERUR creates the URL to contain the resource proxy address and at least one parameter which comprises an encoded representation of the URL of the remote resource 98, i.e., the "resource URL". Subsequent client requests will contain this encoded representation of the resource URL. The resource proxy 200 thus is able to decode the resource URL and request the resource from the producer portal 100A. Assign a low weight to this URL. The low weight indicates that the consumer wants the client to use this URL only when no other URL works for the client. Third, if a resource replica management system (RRMS) is configured for ERUR: Decode the encoded representation of the URL and issue a request to the RRMS, the request containing the resource URL. The RRMS may return a list of replicas of the resource, the entries in the list containing a replica ID, a replica URL under which the replica is accessible and a weight. For each replica the URL and the weight are added to the set of URLs.

The generated script code fragment comprises one function called invokeURL and optionally may comprise another function called selectURL.

According to this embodiment ERUR 325 modifies the portlet markup by replacing the resource URL of the remote network resource 99 by a reference which invokes the script function invokeURL. It also includes the script function invokeURL (and optionally selectURL) as well as the set of URLs in the portlet markup.

Finally the portal page is returned to the client, step 450.

When an end user activates the resource link, the client invokes the function invokeURL, which selects the highest weighted URL—step 470—and tries to invoke the URL, see steps 480 and 490, which is also expressed by the inventional "direct access" arrows 97 in FIG. 1C.

If the invocation succeeds, it returns. If the invocation does not succeed, it selects the next URL according to the weight ranking and tries to invoke this URL by performing again steps 480 and 490. The function invokeURL may be implemented to store the invocation result for each URL, and to use this result for future resource URL invocations, such that URLs pointing to non-accessible hosts are skipped.

An optional step 460 is to be done after step 450 and before step 470 and to be performed by the client in parallel to presenting the markup to the user.

This step 460 invokes the before-mentioned optional function selectURL. This function is implemented to select the URL according to said heuristics considering weight and accessibility. The function selectURL stores the selected URL. So, invokeURL may directly use this URL without performing a further selection or any tests. The advantage results that the URL selection is performed before the user activates the link, which may significantly improve latency and user experience.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method to be performed by a consumer portal server for providing access to a remote network resource addressed by a respective resource URL in a web portal infrastructure comprising a WSRP consumer portal connectable to a client browser requesting said remote network resource, the consumer portal being a middleware framework separate from the client browser and from a source of resources that aggregates the resources from a plurality of sources before presentation to the client browser, and a remote communication partner hosting said remote network resource, the method comprising:

in response to an incoming client request for a web page, determining, by the consumer portal, if the requested web page comprises remote portlets;

for remote portlets, sending, by the consumer portal in response to the incoming client request, a request for a respective portlet markup to a producer of said remote portlets, the remote portlets being portlets that reside on a remote portal server that is separate from the consumer portal server;

receiving, by the consumer portal, a response from the producer to said request, the response comprising a markup document including representations encoded by the producer of network URLs of a respective remote network resource;

searching, by the consumer portal, said response for producer encoded resource URLs of remote network resources, resulting in a set of found URLs;

generating, by the consumer portal, for each producer encoded resource URL a set of rewritten URLs, wherein each rewritten URL provides an access performable by said client that is direct to an original instance of said remote resource without needing an interaction of the WSRP consumer portal;

generating, by the consumer portal, from said received markup document a new markup document comprising an executable code fragment, having the function to be executed by the client to select a specific rewritten URL out of said set of rewritten URLs; and sending, by the consumer portal, a newly assembled web page comprising said new markup document for remote portlets and an unchanged markup document for non-remote portlets to the client.

2. The method according to claim 1, further comprising:

adding a weight to each found URL, said weight being a parameter reflecting the response time required to access the said remote network resource;

adding an executable code fragment ready to be invoked by the requesting client browser, which comprises functionality to select the best weighted URL, and to invoke said best weighted URL; and replacing the found resource URL by a reference which invokes said executable code fragment.

3. The method according to claim 1, wherein the response time is measured at the consumer portal asynchronously to the client request.

4. The method according to claim 1, wherein a WSRP consumer portlet performs the response time measurements.

5. An electronic data processing system to be implemented in a consumer portal server for providing access to a remote network resource addressed by a respective resource URL in a web portal infrastructure comprising at least: a WSRP consumer portal connectable to a client browser requesting said remote network resource, the consumer portal being a middleware framework separate from the client browser and from a source of resources that aggregates the resources from a plurality of sources before presentation to the client browser, and a remote communication partner hosting said remote network resource, characterized by a functional component implementing programming code, which when executed, performs the steps of:

in response to an incoming client request for a web page, determining, by the consumer portal, if the requested web page comprises remote portlets, the remote portlets being portlets that reside on a remote portal server that is separate from the consumer portal server;

for remote portlets, sending, by the consumer portal, a request for a respective portlet markup to a producer of said remote portlets;

receiving, by the consumer portal, a response from the producer to said request, the response comprising a markup document including representations encoded by the producer of network URLs of a respective remote network resource;

searching, by the consumer portal, said response for producer encoded resource URLs of remote network resources, resulting in a set of found URLs;

generating, by the consumer portal, for each producer encoded resource URL a set of rewritten URLs, wherein each rewritten URL provides an access performable by said client that is direct to an original instance of said remote resource without needing an interaction of the WSRP consumer portal;

generating, by the consumer portal, from said received markup document a new markup document comprising an executable code fragment, having the function to be executed by the client to select a specific rewritten URL out of said set of rewritten URLs; and sending, by the consumer portal, a newly assembled web page comprising said new markup document for remote portlets and an unchanged markup document for non-remote portlets to the client.

6. A computer program product to be performed by a consumer portal server for providing access to a remote network resource addressed by a respective resource URL in a web portal infrastructure comprising at least: a WSRP consumer portal connectable to a client browser requesting said remote network resource, the consumer portal being a middleware framework separate from the client browser and from a source of resources that aggregates the resources from a plurality of sources before presentation to the client browser, and a remote communication partner hosting said remote network resource, comprising a computer useable device including a computer readable program, wherein the computer readable program includes a functional component characterized by a functional component implementing programming code, which when executed, performs the steps of:

in response to an incoming client request for a web page, determining, by the consumer portal, if the requested web page comprises remote portlets, the remote portlets being portlets that reside on a remote portal server that is separate from the consumer portal server;

for remote portlets, sending, by the consumer portal, a request for a respective portlet markup to a producer of said remote portlets;

receiving, by the consumer portal, a response from the producer to said request, the response comprising a markup document including representations encoded by the producer of network URLs of a respective remote network resource;

searching, by the consumer portal, said response for producer encoded resource URLs of remote network resources, resulting in a set of found URLs;

generating, by the consumer portal, for each producer encoded resource URL a set of rewritten URLs, wherein each rewritten URL provides an access performable by said client that is direct to an original instance of said remote resource without needing an interaction of the WSRP consumer portal;

generating, by the consumer portal, from said received markup document a new markup document comprising an executable code fragment, having the function to be executed by the client to select a specific rewritten URL out of said set of rewritten URLs; and sending, by the consumer portal, a newly assembled web page comprising said new markup document for remote portlets and an unchanged markup document for non-remote portlets to the client.

* * * * *